United States Patent
Ginsburgh et al.

(10) Patent No.: US 6,293,525 B1
(45) Date of Patent: Sep. 25, 2001

(54) ECONOMICAL APPARATUS FOR PRODUCING IMPROVED COMBUSTION AND SAFETY-ENHANCED FUEL

(76) Inventors: Irwin Ginsburgh, 24125 Clearbank La., Newhall, CA (US) 91221; Darrell Jay Metcalf, 905 N. Oak Ave., Fillmore, CA (US) 93015; Clyde LeRoy Tichenor, 6470 LaCumbre Rd., Somis, CA (US) 93066

(*) Notice: Subject to any disclaimer, the term of this patent is extended or adjusted under 35 U.S.C. 154(b) by 0 days.

(21) Appl. No.: 09/332,409

(22) Filed: Jun. 14, 1999

Related U.S. Application Data

(60) Provisional application No. 60/089,376, filed on Jun. 15, 1998.

(51) Int. Cl.[7] ............................................ B01F 3/04
(52) U.S. Cl. .......................... 261/77; 44/639; 220/88.3; 244/129.2; 244/135 R; 261/93; 261/119.1; 261/121.1; 261/123; 261/124; 261/DIG. 2
(58) Field of Search .................... 261/36.1, 77, 119.1, 261/72.1, 119.2, 123, 124, 72.2, 78.2, 93, 121.1, DIG. 2; 48/192; 44/639; 220/88.3; 244/129.2, 135 R

(56) References Cited

U.S. PATENT DOCUMENTS

| | | | | |
|---|---|---|---|---|
| 1,533,309 | * | 4/1925 | Durborow | 220/88.3 |
| 1,533,587 | * | 4/1925 | Durborow | 220/88.3 |
| 1,916,060 | * | 6/1933 | Memini | 261/72.2 X |
| 3,039,862 | * | 6/1962 | Yocham | 261/119.1 X |
| 3,691,730 | * | 9/1972 | Hickey et al. | 261/121.1 X |
| 3,710,549 | * | 1/1973 | Nichols et al. | 261/36.1 |
| 3,732,668 | * | 5/1973 | Nichols | 261/77 X |
| 3,788,039 | * | 1/1974 | Bragg | 220/88.3 |
| 3,788,040 | * | 1/1974 | Bragg et al. | 261/121.1 X |
| 3,825,111 | * | 7/1974 | Pipkins | 261/119.1 X |
| 3,948,626 | * | 4/1976 | Bragg | 220/88.3 X |
| 4,074,666 | * | 2/1978 | Pierce et al. | 261/119.1 X |
| 4,217,316 | * | 8/1980 | Germerdonk et al. | 261/123 |
| 4,374,649 | * | 2/1983 | Rao | 261/124 X |
| 4,399,079 | * | 8/1983 | Lowe | 261/119.1 X |
| 5,176,002 | * | 1/1993 | O'Brien et al. | 220/88.3 X |
| 5,220,799 | * | 6/1993 | Lievens et al. | 220/88.3 X |
| 5,979,481 | * | 11/1999 | Ayresman | 220/88.3 X |
| 6,136,267 | * | 10/2000 | Bergman | 244/135 R X |
| 6,145,599 | * | 11/2000 | Mumme | 220/88.3 X |

* cited by examiner

Primary Examiner—Richard L. Chiesa

(57) ABSTRACT

Apparatus for facilitating the mixing, absorption and/or retention of carbon dioxide 'CO2' in hydrocarbon fuel to economically produce a safety-enhanced and/or improved-combustion fuel. The apparatus includes at least one mixing receptacle having at least one coupling with a controllable inert gas supply; at least one coupling with a controllable hydrocarbon fuel supply; and at least one coupling with a CO2-enriched fuel fuel-line. The mixing receptacle(s) is configured to retain a volume of fuel and a volume of CO2 such that CO2-enriched fuel having a controllable gas-fuel ratio is the product of the mixing receptacle(s) and the gas of the ratio(s) exceeds 0.1 volume of CO2 per volume of fuel and is less than approximately 3 volumes per volume of fuel when conveyed from the receptacle(s). The apparatus controls the exposure of hydrocarbon fuel molecules to an optimal volume of CO2 within the receptacle(s). One embodiment of the invention includes the adaptation of the apparatus to existing fuel-burning devices, i.e. for retrofitting the apparatus thereto. The apparatus mixes and/or stores CO2 in the fuel to achieve one or more of the following benefits: fuel receptacle safety-enhancement; improved engine combustion; reduction in undesirable emissions such as soot particulate; reduction in fuel droplet size; and/or, reduced fuel viscosity.

24 Claims, 5 Drawing Sheets

ECONOMICAL APPARATUS FOR PRODUCING IMPROVED COMBUSTION AND SAFETY-ENHANCED FUEL

This is a non-provisional application which relies on provisional patent application, Ser. No. 60/089,376 filed on Jun. 15th of 1998.

OVERVIEW OF THE INVENTION

1. Field of the Invention

In co-pending patents (by two or more of the inventors of the present invention), practical methods are shown to provide and/or control safety-enhanced fuel and also improved combustion fuel in various types of fuel receptacles and fuel systems, including fuel systems of engine-powered vehicles and fuel-burning devices. These co-pending patents disclose the values of hydrocarbon fuel that is mixed with an inert gas (such as $CO_2$). The present invention discloses an economical method to produce safety-enhanced fuel comprising the incorporation of a hydrocarbon fuel and inert gas mixing apparatus which mixes highly absorbable inert gas(es) in hydrocarbon fuel.

2. Background of the Invention

Engine-powered vehicle safety is an important concern for all who travel. Numerous agencies, domestically and abroad, have been created and continue to operate with the sole purpose to monitor and improve systems, guidelines, and procedures, relating to the manufacture, maintenance and operation of travel and transportation vehicles. Most of these vehicles utilize some form of hydrocarbon fuel. The enormous power of hydrocarbon fuel is widely known, and when channelled properly it provides one of our most efficient sources of energy for travel, transportation and the like. However, the power of the fuel occasionally averts the safety designs of the systems that were created to control it, sometimes with tragic consequences. Some of these consequences, or their severity, may be significantly reduced or avoided completely, by the incorporation of a fuel within engine-powered vehicles which contains a high enough concentration of highly absorbable inert gas--within the fuel--as to be 'self-inerting fuel'. Indeed, in the wake of the tragic outcome of TWA Flight 800 out of New York, the FAA recently announced their desire to see aircraft incorporate some form of fuel inerting system, perhaps with the poignant realization that had the central fuselage tank of that 747 had a sufficient volume of inert gas therein, it would not have been able to support the ignition and combustion of the tank's volatile contents. Such public outcry for such a solution has typically implied a costly retrofitting of 25,000+ aircraft and/or manufacturing of expensive on-board aircraft 'hardware' solutions for new planes. The present invention requires little or no retrofitting of engine-powered vehicles and discloses an economical and efficient method to produce safety-enhanced fuel. For example, an inert gas such as $CO_2$, is highly absorbable in hydrocarbon fuel, and depending on various conditions can be absorbed into a hydrocarbon fuel up to a 3:1 ratio (and higher using positive pressures during mixing and/or storing). One volume of such hydrocarbon fuel can contain three times its own volume of absorbed $CO_2$ with a range of 1–2 times the $CO_2$ absorbable in many commercial fuels representing a more typical range (with higher mixing pressures additional absorption is possible). The molecular mixing of the fuel and the inert gas is highly efficient and synergistic in that the volume of the safety-enhanced fuel and its weight is minimally altered within the various ranges of gas-absorption. According to mixing parameters that are controllable, such as the amount of pressure with which the inert gas is mixed into the fuel, the inert gas will desorb from the fuel into a fuel receptacle's ullage over time at predictable rates. It has been shown that a fuel receptacle ullage concentration of inert gas such as $CO_2$ in the range of 40–50% is, under most circumstances (including abnormally high temperatures), sufficient to prevent ignition or combustion of the remaining vapor and air mixture within the ullage. Since the volume of gas which can be absorbed in the fuel can readily exceed the volume of the fuel itself (without significantly altering the fuel volume or weight), it is possible to meet and exceed the 40–50% ignition-preventative range of inert gas needed in the fuel receptacle ullage as the fuel is used and as the inert gas contained in the remaining fuel continues to desorb from the fuel. Thus, little or no alteration is required of vehicles incorporating such safety-enhanced fuel, and an efficient and economical method to retrofit and increase the safety of vehicle's utilizing such fuels is provided. An additional benefit occurs with the presence of absorbed gas in fuel droplets allowing the gas to desorb as pressure falls or temperature rises, whereby the expanding gas bubbles (in the droplets) cause a separation of the droplets into microdroplets which promotes better combustion of the fuel including substantial decreases in emissions and soot particulates.

In the case of an engine-powered vehicle such as a commercial jet for example, an aircraft will receive fuel containing a substantial volume of inert gas such as $CO_2$, as the plane awaits departure and then taxiis, factors such as time, fuel temperature increases and the mild agitation of taxiing and the subsequent take-off roll of the aircraft, assist in the desorption of $CO_2$ from the fuel. The inert gas will tend to stratify above the fuel and prevent the development of a potentially volatile layer of fuel vapor and air mixture. As the concentration of $CO_2$ within the ullage increases through desorption, the lighter volatile layer above it is forced out of the ullage through the fuel tank vents. Further purging is facilitated by the increase of altitude and the relative negative pressures associated therewith, which serve to draw out the uppermost layer of ullage-content. During the ascent phase and cruising phase of the aircraft, an additional gas-desorbing factor is introduced as the relative negative pressure of the surrounding air assists in drawing out $CO_2$ from the fuel into the ullage. With flights of longer durations (at cruising altitudes), the fuel and ullage are also cooled over time, which increases fuel ignition-preventative safety and increases the ability of the fuel to absorb and/or retain $CO_2$ therein until the descent phase of the flight where the warming of the fuel, and the agitiation of the fuel during landing and subsequent taxiing, are additional factors which assist in the purging of remaining $CO_2$ from the fuel. As previously mentioned, mixing conditions such as temperature of the fuel and the pressure with which the inert gas is mixed into the fuel, affect absorpsion and desorption rates of the gas into and out of the fuel. Thus, it is possible to mix the inert gas with the hydrocarbon fuel under higher pressures for flights of shorter durations whereby the gas contained therein will desorb at a faster and optimal rate, and conversely to mix gas with fuel at lower pressures (including negative pressures whenever advantageous) for flights of longer durations. Alternatively, a conduit-receptacle having at least one controllable fuel inlet and at least one controllable inert gas inlet (including control of variable gas pressure ranges), with at least one controllable outlet, leading to a vehicle re-fueling station, can transmit any one, or combination, of: fuel and highly absorbable inert gas; or safety-enhanced fuel; and improved combution fuel to the vehicle, or fuel-burning device. For example, with aircraft having flights of shorter durations (where the fuel tanks are intentionally only partially filled to minimize weight), it can be advantageous to first fill ullage(s) with inert gas before taking on safety-enhanced fuel. Higher pressure absorpsion rates are also employable for flights of shorter durations, thus the ullage of such tanks are quickly filled with the faster desorbing gas which can be optimally time-released for the flight's duration. Further, the control of inert gas mixing pressures can be used to facilitate the mixing of inert gas such as $CO_2$ into hydrocarbon fuels, e.g. diesel fuel, so that micro-droplets of fuel (facilitated by the absorbed $CO_2$ molecules) are obtained in the combustion phase of an engine to increase combustion efficiency and/or reduce carcinogenic materials (particularly with the burning of richer mixtures of fuel), thus increased engine performance and/or an improved operation as it relates to our environment, health and safety is achieved.

PRIOR ART

A search of patent literature has not disclosed methods to produce self-inerting or improved combustion fuel having a sufficient volume of inert gas containable therein to provide and/or sustain an ullage concentration of inert gas exceeding the 40–50% (nominal minimums) needed in order for the ullage contents to be considered ignition-preventative--or for the concentrations needed for improved combustion. Thus, the typical path, in the aircraft industry for example, has been the discussion or contemplation of manufacturing and retro-fitting all operational commercial aircraft with some kind of on-board 'hardware' inerting system. In that there are approximately 25,000+ such aircraft, such a path is considered daunting, time-consuming and extremely costly. For example, the inclusion of bulky and heavy auxiliary tanks for storing and routing inert gas such as Nitrogen has been considered, as well as inert gas generators, and various systems to capture and re-use gases from the aircraft engines. However, these systems have not proven to be either practical, effective, economical and/or reliable as of yet. Thus, the aircraft industry (as one of the largest sectors of engine-powered vehicles) is left in want of a practical, economical and readily employable solution. Furthermore, fuels with a concentration of absorbed CO2 of approximately 10% or greater, facilitate fuel/air mixing in the combustion zone of a fuel-burning device by providing a reduction in fuel droplet sizes. It is the purpose of the present invention to overcome such limitations and to provide such an alternative to the aircraft industry and to those industries and agencies concerned with the operation, combustion and safety of engine-powered vehicles, fuel-burning devices, and the fuel storage and/or fuel systems relating to such vehicles and devices. It is also the purpose of the present invention to provide an apparatus for facilitating the mixing, absorption and/or retention of inert gas (such as carbon dioxide 'CO2', nitrogen, or a plurality of inert gases) in hydrocarbon fuel, comprising a mixing receptacle having at least one coupling means for connection with a controllable inert gas supply; at least one coupling means for connection with a controllable hydrocarbon fuel supply; and at least one coupling means for connection with an inert gas-enriched or improved combustion fuel distribution means, and, the receptacle further comprising mixing apparatus suitable for controlling the exposure of hydrocarbon fuel molecules to an optimal volume of inert gas within said receptacle. One embodiment of the invention includes the adaptation of the apparatus to existing fuel-burning devices, i.e. for retrofitting thereto. The apparatus mixes and/or stores inert gas in the fuel to achieve one or more of the following benefits: fuel receptacle safety-enhancement; improved engine combustion; reduction in undesireable emissions; reduction in fuel droplet size; and/or, reduced fuel viscosity.

BRIEF DESCRIPTION OF DRAWINGS

All Figures are Diagrammatical

DESCRIPTION OF THE PREFERRED EMBODIMENTS

Figure 1:
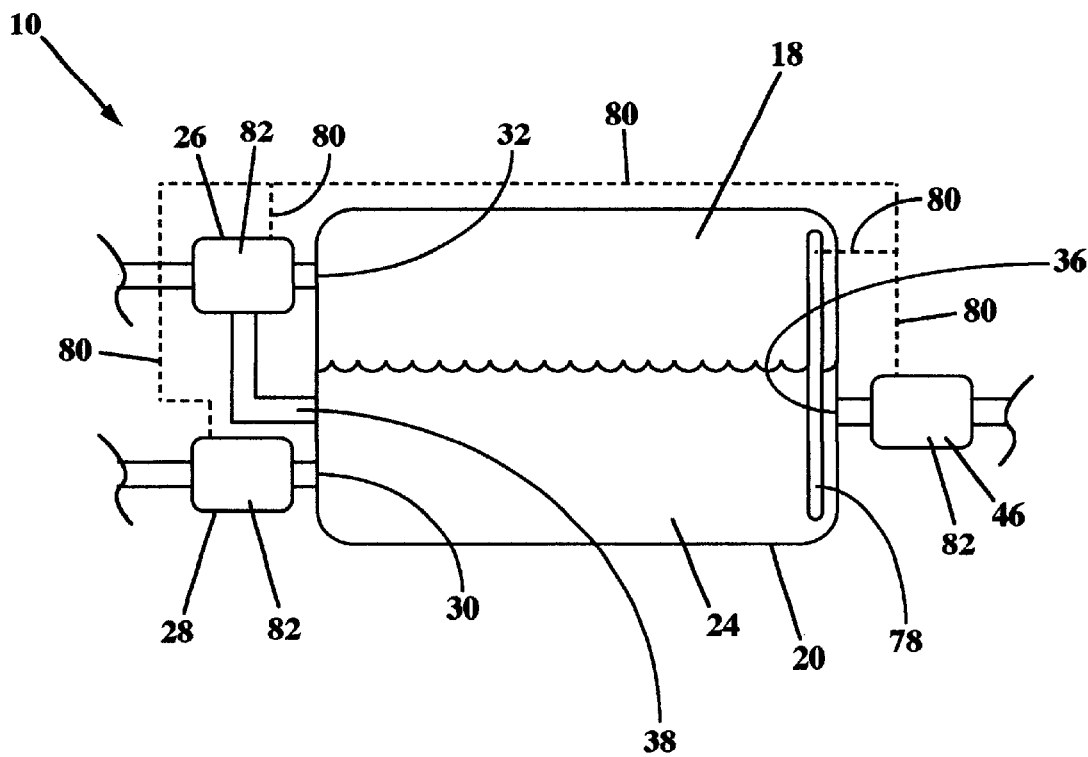
FIG. 1 is a view of a safety-enhanced or improved combustion fuel mixing apparatus according to the present invention showing a mixing receptacle wherein a controllable supply of inert gas and hydrocarbon fuel is mixed in controllable gas-fuel ratios ranging from 0.1:1to 3:1 gas concentrations within the fuel, and then controllably conveyed through at least one outlet of the receptacle.
Figure 2:
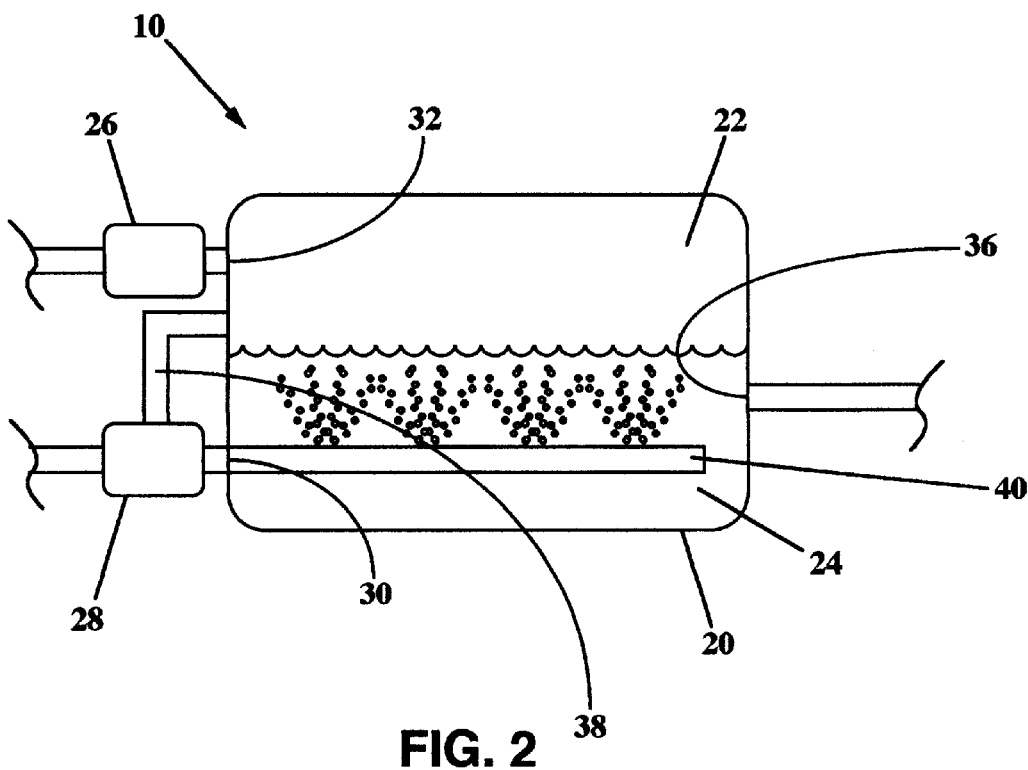
FIG. 2 is a view of a safety-enhanced or improved combustion fuel mixing apparatus showing a receptacle having an inert gas infuser means contained substantially therein.

The present invention provides an efficient and economical mixing apparatus 10 for exposing a controllable and/or optimal volume of inert gas such as $CO_2$ to a controllable and/or optimal volume of hydrocarbon fuel (e.g. Jet fuel, Diesel fuel, engine fuels, fuel oils and the like). As can be seen in the illustrations of FIGS. 1–4 and FIGS. 7–10, the mixing apparatus 10 comprise at least one mixing receptacle 20 suitable for the mixing of fuel 24 and inert gas 18 therein, with mixing receptacle 20 having at least one controllable fuel inlet/coupling means 32 to receive hydrocarbon fuel from a hydrocarbon fuel supply as directed by fuel control means 26, and at least one controllable gas inlet/coupling means 30 to receive inert gas such as $CO_2$ as directed by gas control means 28 from a controllable inert gas supply comprising one or more inert gas. Controllable inert gas inlet/coupling means 30 optionally includes the control means to determine fixed inert gas pressures, send pure inert gas through the mixing receptacle, and/or provide a variable range of inert gas pressures, including when appropriate, negative pressures. It is noted that when receptacle 20 and the coupling means that are attached thereto are so used they are comprised of a type of material suitable for withstanding such pressure differentials. For example in FIG. 2, inert gas control means 28 can in one variation, create a sufficient positive pressure of inert gas to impel it through the openings of the gaseous diffuser means 40 into the hydrocarbon fuel 24. In an alternate variation, gas control means 28 can pump inert gas to a re-fueling location before the fuel control means initiates the pumping of fuel into the mixing receptacle, in which case an engine-powered vehicle's fuel tank ullage can receive a pure controllable dose of inert gas before re-fueling begins. In a third variation, gas control means 28 is optionally equipped with a vacuum pump, to create a negative pressure, for example via receptacle-content re-circulating conduit 38, to create a sufficient negative pressure in the ullage 22 of mixing receptacle 20 to cause the inert gas to travel up through the hydrocarbon fuel 24 at a desired rate. It is noted that fuel control means 26 can optionally be supplied by any one or more of a variety of fuel sources including fuels suppliable in various temperatures such as chilled fuel, and/or fuel otherwise optimized for inert gas absorpsion such as hydrocarbon fuel with additional light hydrocarbon atoms. Similarly, inert gas such as $CO_2$ can readily be stored in a chilled non-gaseous state e.g. liquid or solid and used as an inert gas supply—including a gas supply that when expanding during phase conversion provides a naturally occurring positive pressure source. In another embodiment of the present invention an inert gas supply can consist in, or be augmented by, the exhaust of a fuel-burning device which can be tapped by one or more suitable conduit and directed to the gas inlet of receptacle 20. It is also noted that the apparatus of the present invention can be carried on and/or retrofitted on-board a vehicle or fuel-burning device whether tapping its exhaust and/or deriving inert gas from an independent supply such as one or more pressurized gas tank. Alternatively, mixing receptacle 20 can facilitate a passive mixing of inert gas-enriched fuel whereby the fuel and inert gas(es) within the receptacle are mixed by fluid convection which circulates fuel to the fluid surface creating contact with a controllable concentration of gas. Similarly, when receptacle 20 maintains an ullage which is sufficient in volume and having a suitable concentration of inert gas therein, a desired equilibrium fuel/gas ratio can be established and maintained within the inert gas-enriched fuel. Another passive mixing means is achieved within receptacle 20 when fuel entering the receptacle is splashed within a region of the receptacle that is also exposed to a controllable concentration of inert gas such as $CO_2$, or when the fuel is directed over a splash-inducing contoured surface (not shown) as it is directed into, or descends into, the receptacle and is simultaneously exposed to an optimal concentration of gas.

Mixing receptacle 20 has one or more safety-enhanced or improved combustion fuel outlet/coupling means 36, which is connectable with an inert gas-enriched fuel distribution means such as outlet control means 46, to convey safety-enhanced fuel as needed. The control means 26, 28 and 46, are comprised of any one or more in a variety of known control device(s) such as automated, computer-controlled, or manually controlled, pump(s), valve(s), re-circulating device(s), manifold(s), and the like. Alternatively, the mixing receptacle(s) 20 can also comprise any one or more in a variety of known measuring and/or monitoring means 78, such as monitoring, measuring, reporting device(s) and/or instruments used to measure or regularly sample pressure, temperature, chemistry composition, gas concentration levels, and the like, including the incorporation of monitoring means communication signal 80 with receptacle-content control means 82 (fuel control means 26, inert gas control means 28, and safety-enhanced fuel control means 46, inclusively) in order to facilitate the automation of optimal mixing of the inert gas in the hydrocarbon fuel. Communication signal 80 can be transmitted through a suitable conduit connected between monitoring means 78 and any one or more of the control means, or alternatively can be transmitted by wireless transmission, in which case monitoring means 78 and any one or more of the control means are comprised of communicating transmitter(s) and receiver(s) respectively.

A first iteration of the present invention shown in FIGS. 1–4 and FIGS. 7–10, includes a safety-enhanced or improved combustion fuel mixing means which is contained substantially within the interior of mixing receptacle(s) 20 and optionally includes one or more receptacle-content re-circulating conduit 38 for re-circulating or recycling inert gas, fuel, and/or safety-enhanced fuel within receptacle(s) 20. The safety-enhanced or improved combustion fuel mixing means are comprised of any one or more in a variety of known gas/fuel mixers, including but not limited to: a fuel atomizer means 34 (FIG. 3) such as one or more atomizing sprayer to spray liquid hydrocarbon fuel into a volume of inert gas; a gaseous diffuser means 40 (FIG.2) such as one or more gas diffuser means comprised of either a porous material, or a material having a multiplicity of apertures, either type of diffuser being suitable for releasing a multiplicity of small inert gas bubbles into a volume of hydrocarbon fuel; a fuel atomizer means 34 and/or gas diffuser means 40 (FIG. 3); a gaseous diffuser means integrated into a safety-enhanced or improved combustion fuel transferring conduit (FIG. 4); a rotatable agitator means (FIG. 7); a combination rotatable agitator and gaseous diffuser means (FIG. 8); a turbulator means (FIG.9); a combination turbulator and gaseous diffuser means (FIG. 10); or, a carbonator means (not illustrated).

Figure 3:
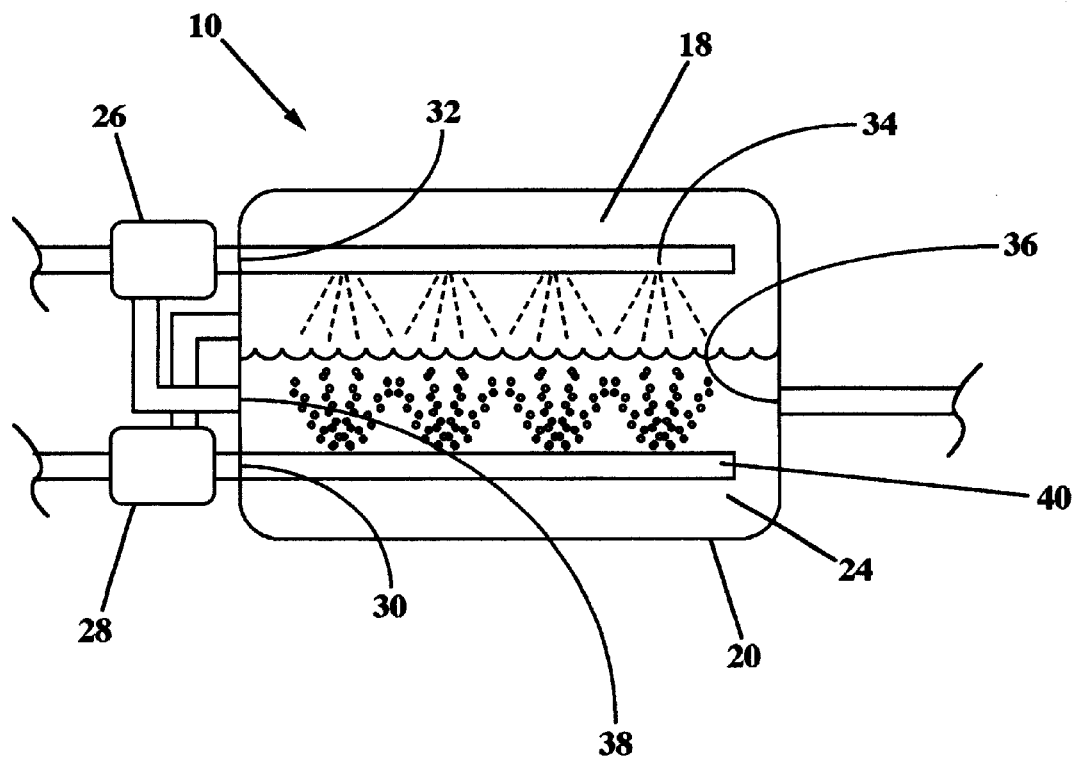
FIG. 3 is a view of a safety-enhanced or improved combustion fuel mixing apparatus showing a receptacle having a hydrocarbon fuel atomizer means and an inert gas infuser means contained substantially therein.
Figure 4:
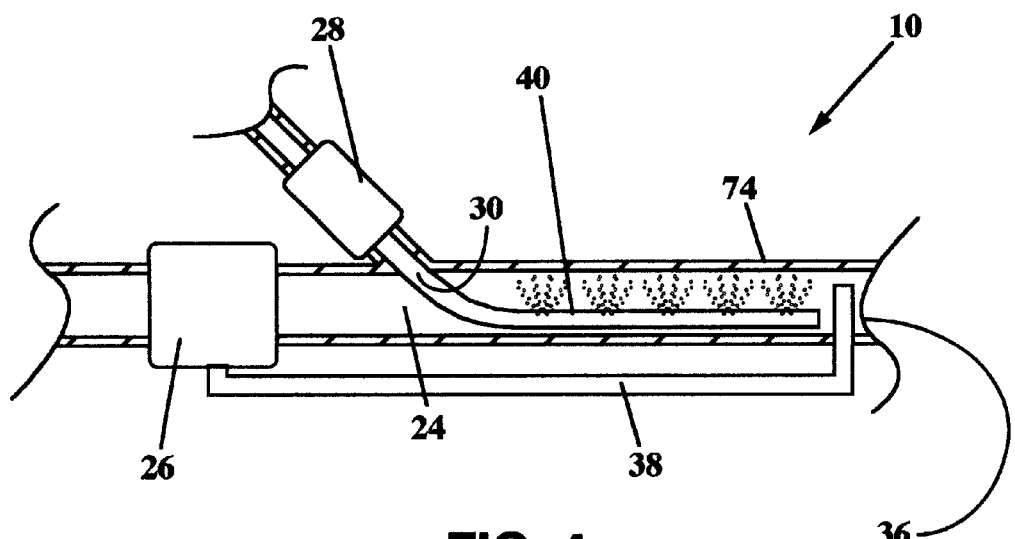
FIG. 4 is a view of a safety-enhanced or improved combustion fuel mixing apparatus showing a fuel conduit-receptacle having a gas diffuser contained therein and conduit means to convey safety-enhanced or improved combustion fuel.

In FIG. 3 a safety-enhanced fuel mixing apparatus 10 is shown illustrating a mixing receptacle 20 having an internal hydrocarbon fuel atomizing means 34 and/or an inert gas diffuser means 40 (or inert gas infusing means). Fuel atomizing means 34 is controlled by fuel control means 26 which is connected to an external fuel source, and inert gas diffuser means 40 is controlled by gas control means 28 which is connected to an external inert gas source. An optional re-circulating conduit 38 is shown connected to each of the control means 26 and 28 respectively, such that the fuel and/or gas can readily be re-circulated within the mixing receptacle 20 as needed before being transferred out of safety-enhanced fuel outlet 36. FIG. 4 illustrates a safety-enhanced fuel mixing apparatus 10 showing a fuel conduit-receptacle 74 having a gas diffuser means 40 contained therein and safety-enhanced fuel outlet 36 to further convey the gas-enriched fuel along an extended conduit (not shown) to a desired re-fueling location. In FIG. 4, gas control means 28 pumps gas via inert gas inlet/coupling means 30 into at least one gas diffuser means 40. Optionally, a gas diffuser means 40 can be extended internally along a length of fuel conduit-receptacle 74 for example through inlet 30, such that an optimal length of the gas diffuser may be selected for a particular application. In either case, the fuel is driven by fuel control means 26 through fuel conduit-receptacle 74 adjacent to the gas diffuser means 40, and can optionally be recycled via re-circulating conduit 38.

Figure 5:
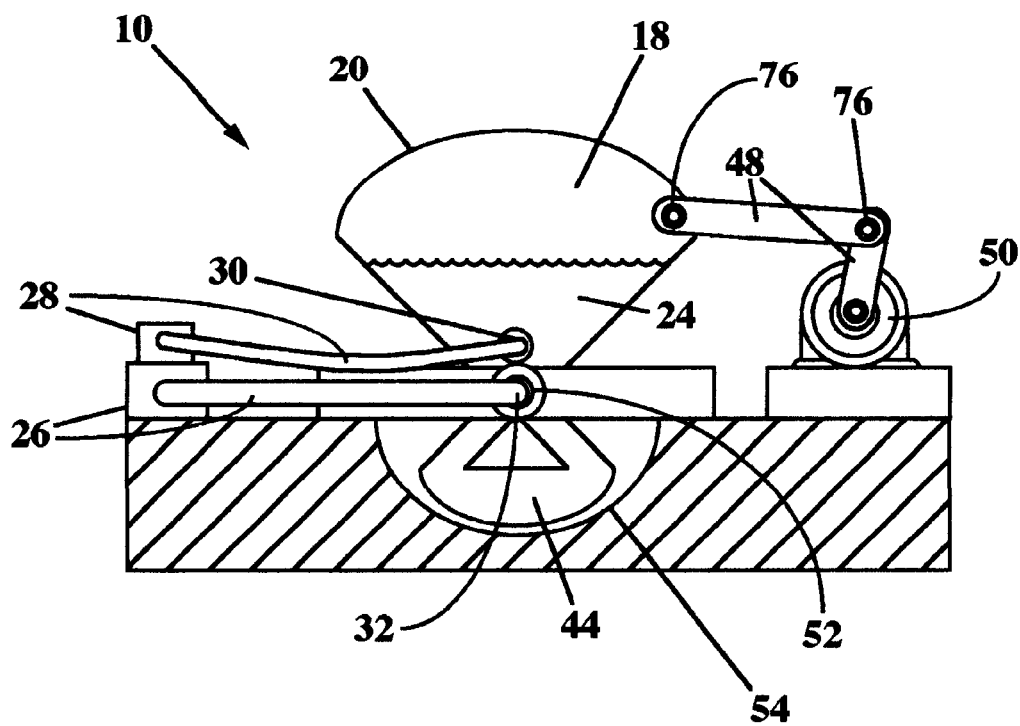
FIG. 5 and FIG. 6 are views of a safety-enhanced or improved combustion fuel mixing apparatus shown with an external drive means actuating a movable mixing receptacle.
Figure 6:
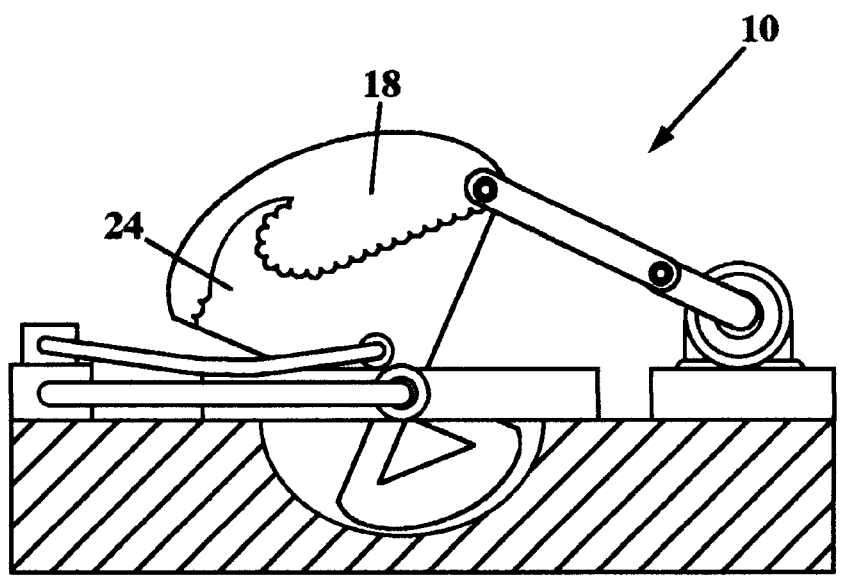

A second iteration of the present invention illustrated in FIG. 5 and FIG. 6 shows a safety-enhanced or improved combustion fuel mixing apparatus which is substantially actuated by means external to the mixing receptacle(s) 20 wherein the mixing apparatus 10 comprises at least one movable or shakable mixing receptacle 20 suitable for containing a volume of inert gas 18 which is received via inert gas inlet/coupling means 30 and a volume of hydrocarbon fuel 24 which is received via hydrocarbon fuel inlet 32. Mixing receptacle 20 is actuated by externally connected propulsion means 50 such as a motor, engine, or any one or more in a variety of known drive means suitable to provide oscillatory cycling of receptacle 20. FIG. 5 and FIG. 6 further show propulsion means 50 and mixing receptacle 20 with propulsion arms 48 and propulsion arm pivots 76 connected therebetween, such that the connected propulsion means are sufficient to actuate the movement of mixing receptacle 20 about a fixed receptacle pivot means 52, such as a receptacle shaft operative within a friction-reducing means like a bushing or bearing (not shown). Optionally, a counter-balance weight 44 can be provided to facilitate the cycling of the mixing receptacle about its pivot point, and a counter-balance well 54 may also be incorporated when desired. Inert gas control means 26 and hydrocarbon fuel control means 28 are also shown resiliently connected to inlet 30 and inlet 32 respectively, such that mixing receptacle 20 is free to move with minimal movement of the connected control means. Optionally, in this mode of the present invention, fuel control means 26 can be dual-purposed to pump safety-enhanced or improved combustion fuel from mixing receptacle 20 after the fuel and gas have been suitably mixed. FIG. 6 illustrates a different phase of an oscillatory cycle of the mixing apparatus, wherein the agitation and mixing of hydrocarbon fuel 24 and inert gas 18 can readily be envisioned.

Figure 7:
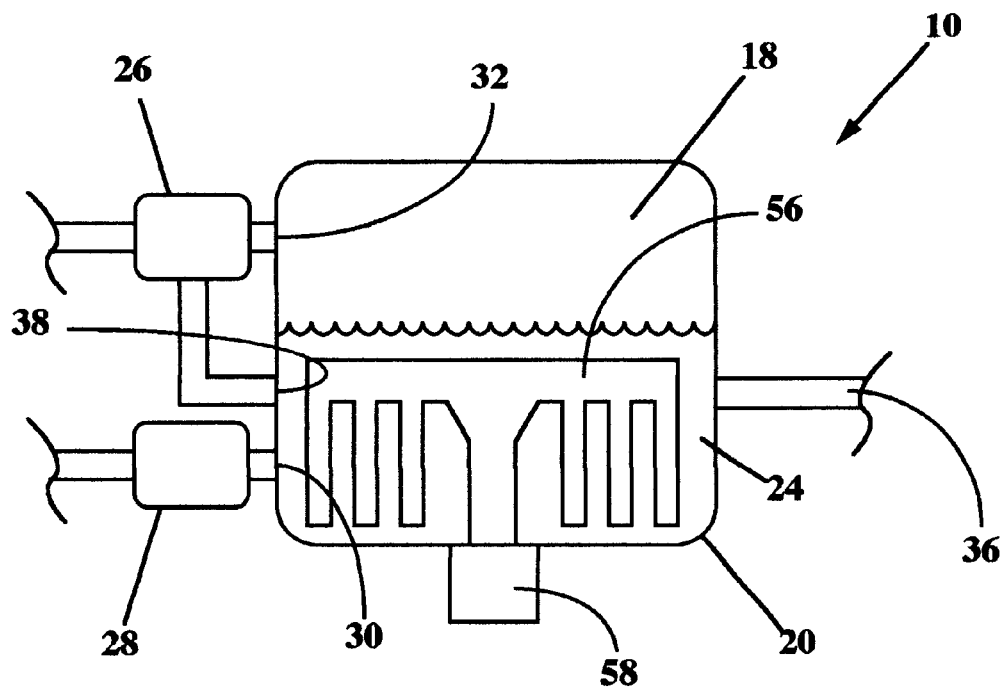
FIG. 7 and FIG. 8 are views of a safety-enhanced or improved combustion fuel mixing apparatus shown with a rotatable agitator means, with the agitator means of FIG. 8 further incorporating a gas diffuser means.
Figure 8:
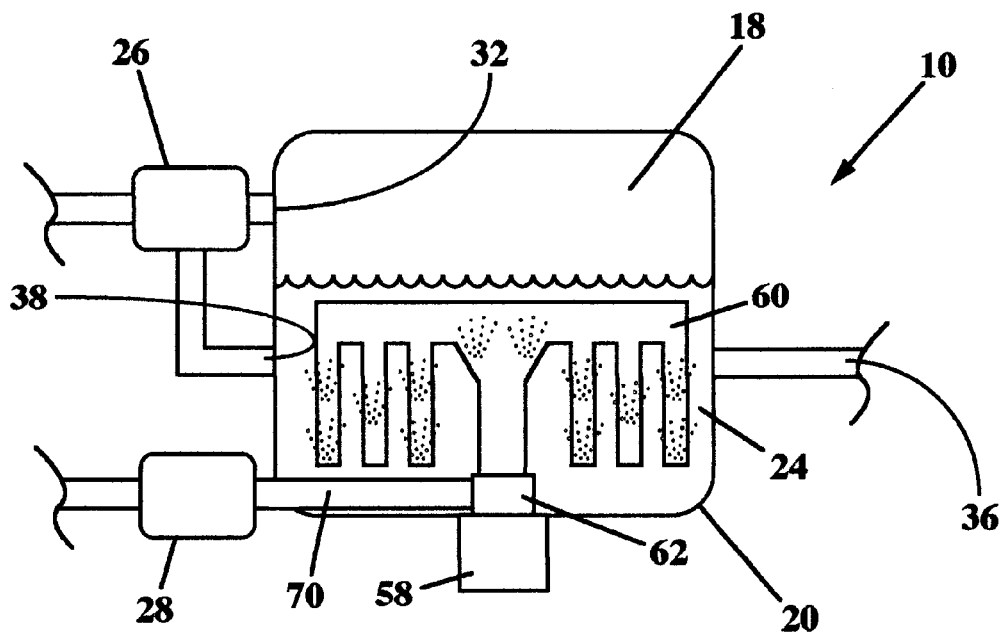

FIG. 7 and FIG. 8 illustrate mixing apparatus 10 having a rotatable agitator means 56, with FIG. 8 further incorporating a rotatable agitator means 56 also having an integral gas diffuser means 60 which is connected to an inert gas supply, with the fuel, gas and safety-enhanced or improved combustion fuel, being controlled as described in one or more of the previous figures. In FIG. 7 and FIG. 8, the agitator means 56 is affixed to and driven by, a controllable agitator drive means 58, such as any one in a variety of known engines, motors, or combination of engine and rotatable transmission means, or combination of motor and rotatable transmission means, suitable for providing continuous rotation and/or oscillatory cycling of the agitator means 56 in either an automated, or a controlled manner. Agitator drive means 58 and agitator means 56 agitate the hydrocarbon fuel within mixing receptacle 20 such that the inert gas, whether also diffused or not, is readily mixed with the fuel. Agitator means 56 is illustrated having a shape to optimize mixing and it can be seen that numerous alternative shapes can also be provided.

Figure 9:
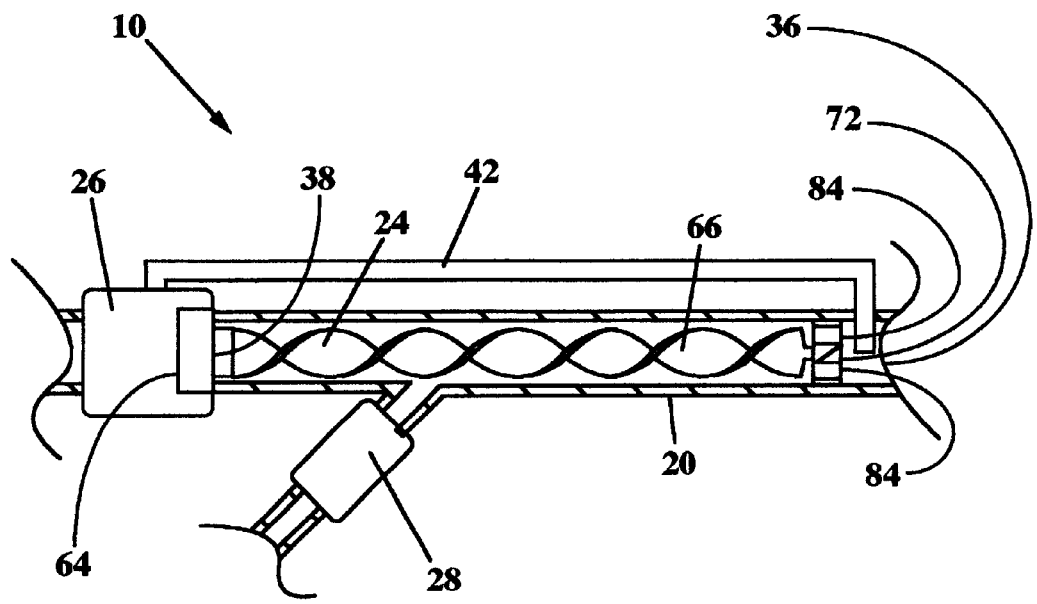
FIG. 9 and FIG. 10 are views of a safety-enhanced or improved combustion fuel mixing apparatus showing a fuel conduit-receptacle having a turbulator means contained therein and conduit means to transport safety-enhanced or improved combustion fuel, with the turbulator means of FIG. 10 further incorporating a gas diffuser means.
Figure 10:
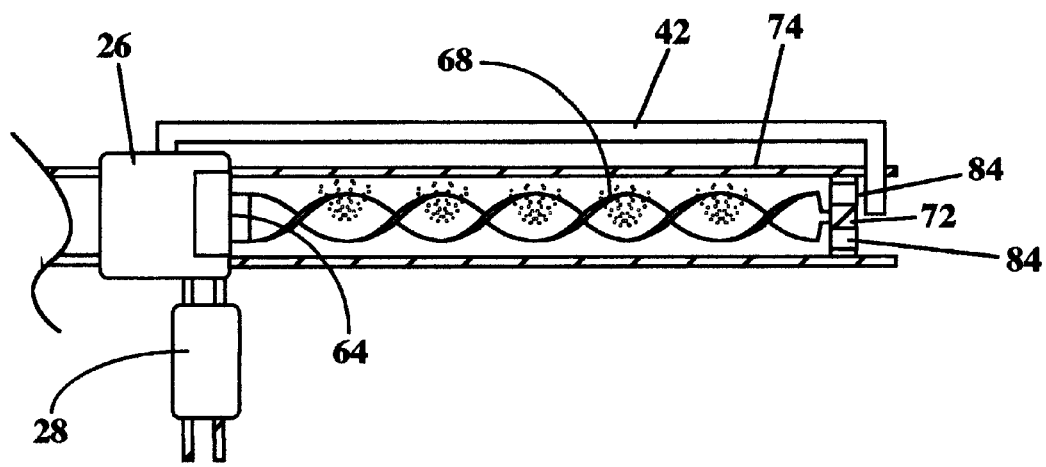

FIG. 9 and FIG. 10 are views of a safety-enhanced or improved combustion fuel mixing apparatus 10, showing a fuel conduit-receptacle 74 having a turbulator means 66 such as a rotatable elongated helix contained therein, and extendable conduit means to transport safety-enhanced fuel to a desired location, with FIG. 10 further illustrating a turbulator with an integrated gas diffuser means 68 rotatably connected to an inert gas source and gas control means 28. Fuel, gas, safety-enhanced or improved combustion fuel, and re-circulation processes are provided and controlled in the manner described in one or more of the previous figures. Turbulator means 66 is rotatably mounted between a turbulator friction-reducing means 72 such as a bearing or bushing concentrically positioned within conduit-receptacle 74 (having one or more safety-enhanced or improved combustion fuel aperture 84) and a turbulator drive means 64, such as any one in a variety of known engines, motors, or combination of engine and transmission means, or combination of motor and transmission means, suitable for providing continuous rotation and/or oscillatory cycling of turbulator drive means 64 in a controlled manner. Safety-enhanced fuel aperture(s) 84 are sized to allow sufficient flow of safety-enhanced fuel therethrough.

Although the present invention has been described with a certain degree of particularity, it is understood that the present disclosure has been made by way of example, and changes in detail or structure may be made without departing from the spirit of the invention in the previous descriptions or as defined in the appended claims.

What is claimed is:

1. A hydrocarbon fuel and carbon dioxide ($CO_2$) mixing apparatus wherein a safety-enhanced and improved combustion $CO_2$-enriched fuel is made, said mixing apparatus comprising at least one mixing receptacle suitable for retaining a volume of fuel and a volume of $CO_2$, said mixing receptacle(s) having:

at least one coupling means for connection with a controllable $CO_2$ supply;

at least one coupling means for connection with a controllable hydrocarbon fuel supply;

and at least one coupling means for connection with a $CO_2$-enriched fuel distribution means, whereby said $CO_2$ supply and said hydrocarbon fuel supply are conveyable into said mixing receptacle(s) in controllable ratios and are conveyed into said mixing receptacle(s) in a manner that promotes fuel circulation and the mixing of said $CO_2$ in said fuel, such that $CO_2$-enriched fuel having a controllable gas-fuel ratio is the product of said mixing receptacle and the gas of said ratio(s) exceeds 0.1 volume of $CO_2$ per volume of fuel and is less than 3 volumes per volume of fuel when conveyed from said receptacle(s) to said fuel distribution means.

2. The $CO_2$-enriched fuel/product of the mixing apparatus of claim 1 wherein the control of concentrations of $CO_2$ within said fuel/product produces micro-droplets in said fuel/product, yielding improved combustion and reduced soot particulate.

3. The mixing receptacle of claim 1 further comprising a receptacle-content monitoring means suitable for regularly sampling and reporting receptacle-content conditions to at least one receptacle-content control means.

4. The mixing receptacle of claim 3 further comprising at least one computer which is responsive to signal received from said receptacle-content monitoring means to control at least one controllable valve.

5. The mixing receptacle of claim 3 further comprising at least one computer which is responsive to signal received from said receptacle-content monitoring means to control at least one controllable pump.

6. The mixing receptacle and receptacle coupling means of claim 1 comprised of material suitable for mixing fuel and $CO_2$ under pressure and for controlling the concentration of said $CO_2$ within said fuel.

7. The mixing receptacle and receptacle coupling means of claim 1 comprised of material suitable for storing fuel and $CO_2$ under pressure and for controlling the concentration of said $CO_2$ within said fuel.

8. The mixing receptacle of the mixing apparatus of claim 1 further comprising coupling means to at least one receptacle-content re-circulation conduit.

9. The mixing receptacle of the mixing apparatus of claim 1 further comprising an ullage within said receptacle which is sufficient in volume when containing a controllable concentration of $CO_2$, to establish a desired equilibrium gas/fuel ratio within the $CO_2$-enriched fuel.

10. The mixing receptacle of claim 9 wherein fluid convection circulates fuel to the fluid surface creating contact with said controllable concentration of CO2.

11. The mixing apparatus of claim 1 comprising a fuel splash-inducing contoured surface which is aligned with the descent of the fuel into said mixing receptacle such that the fuel, as it splashes, is exposed to a controllable concentration of the CO2.

12. The CO2 supply of claim 1 wherein said CO2 is storable in a chilled non-gaseous state in a connectable receptacle.

13. The CO2 supply of claim 1 wherein said CO2 is provided by exhaust of a fuel-burning device.

14. The mixing apparatus of claim 1 further comprising a fuel atomizing means.

15. The mixing apparatus of claim 1 further comprising at least one CO2 infuser means.

16. The mixing apparatus of claim 1 further comprising at least one hydrocarbon fuel atomizer means and at least one CO2 infuser means.

17. The mixing apparatus of claim 1 further comprising at least one gas diffuser means.

18. The mixing apparatus of claim 1 further comprising an external drive means and a movable mixing receptacle wherein said drive means and said receptacle have an actuating member coupled therebetween such that a movement imparted to said member by said drive means causes said receptacle to move, which in turn, promotes the circulation of fuel within said receptacle.

19. The mixing apparatus of claim 1 further comprising a rotatable agitator means.

20. The mixing apparatus of claim 1 further comprising a combination rotatable agitator means and gas diffuser means.

21. The mixing apparatus of claim 1 further comprising a turbulator means.

22. The mixing apparatus of claim 1 further comprising a combination turbulator means and gas diffuser means.

23. The mixing apparatus of claim 1 which is configured to retrofit an existing fuel-burning device.

24. The CO2-enriched fuel/product of the mixing apparatus of claim 1 wherein the gas-to-fuel ratio of said CO2-enriched fuel is controllable and adjusted for the lengths of aircraft flights relative to the fuel volume in the fuel tanks of the aircraft departing on said flights.

* * * * *